Figure 1:
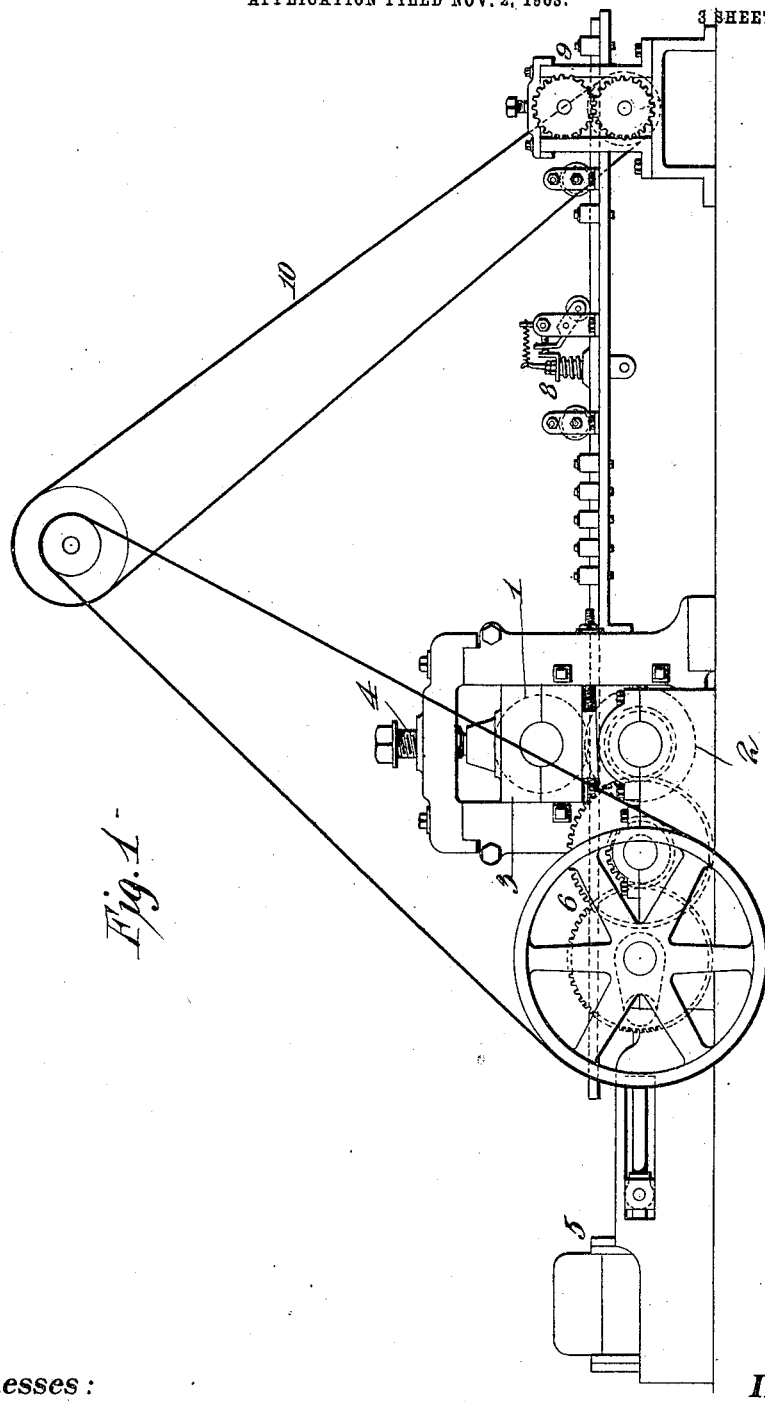

No. 838,471. PATENTED DEC. 11, 1906.
A. SMITH.
PROCESS OF FORMING BILLETS IN THE MANUFACTURE OF MACHINE MADE HORSESHOES.
APPLICATION FILED NOV. 2, 1903.

3 SHEETS—SHEET 1.

Witnesses:
Jas. F. Coleman
Jno. Robt Taylor

Inventor
Arthur Smith
By Dyn & Dyn
Attorneys.

No. 838,471.  
PATENTED DEC. 11, 1906.  
A. SMITH.  
PROCESS OF FORMING BILLETS IN THE MANUFACTURE OF MACHINE MADE HORSESHOES.  
APPLICATION FILED NOV. 2, 1903.

3 SHEETS—SHEET 3.

Witnesses:  
Jas. F. Coleman  
John S. Robek

Inventor  
Arthur Smith  
By Dyer & Dyer  
Attorneys.

THE NORRIS PETERS CO., WASHINGTON, D. C.

UNITED STATES PATENT OFFICE.

ARTHUR SMITH, OF EASTON, PENNSYLVANIA, ASSIGNOR TO AMERICAN HORSE SHOE COMPANY, OF PHILLIPSBURG, NEW JERSEY, A CORPORATION OF NEW JERSEY.

PROCESS OF FORMING BILLETS IN THE MANUFACTURE OF MACHINE-MADE HORSESHOES.

No. 838,471. Specification of Letters Patent. Patented Dec. 11, 1906.

Original application filed April 11, 1903, Serial No. 152,105. Divided and this application filed November 2, 1903. Serial No. 179,567.

*To all whom it may concern:*

Be it known that I, ARTHUR SMITH, a citizen of the United States, residing at Easton, in the county of Northampton and State of Pennsylvania, have invented certain new and useful Improvements in Processes of Forming Billets in the Manufacture of Machine-Made Horseshoes, of which the following is a specification.

My invention relates to processes of forming billets in the manufacture of machine-made horseshoes; and the improvement relates particularly to the process of forming the so-called "crease" in the strand-billet, which is subsequently cut into the desired lengths.

At the present time in the manufacture of machine-made horseshoes a suitable billet, having first been heated to the required temperature, is by means of rolls gradually reduced in cross-section to form a long strand-billet, essentially rectangular in cross-section, but with one of its sides slightly inclined. The strand-billet is then passed between creasing-rolls, by means of which the metal is formed with a succession of creases on its face near the inclined side, each crease being formed at intervals with deeper depressions adapted to be subsequently punched through to constitute the nail-holes.

Heretofore the practice, so far as I am aware, has been to form the creases by passing the strand-billet between rolls, one having a rectangular groove which is partly entered by the tongue-roll, the latter carrying the creasing-dies. This process of manufacture has been open to the objection, among others, that the narrow web on the creased side of the billet becomes distorted opposite the crease, owing to the fact that the sides of the groove must be vertical. Otherwise the billet could not enter or leave the groove. The billet made in the manner heretofore in use has had to be restored to its original shape by being passed through planishing-rolls, greatly increasing the cost of manufacture.

It is the object of the present invention to crease the strand-billet in one operation.

In carrying out the invention the strand-billet is passed through a pass of the same shape as the cross-section of the billet. This pass may be formed in rolls between a groove-roll and a tongue-roll, the latter carrying the creasing-dies; but the process could be carried out without the use of rolls, the pass being formed integral with or separate from the creasing-dies. The groove is not rectangular, but is of the same configuration as the cross-sectional shape of the billet with one side inclined. The sides of the pass being in contact with the billet while the creasing-die is displacing the metal of the billet prevents the web from becoming distorted and obviates the necessity of using planishing-rolls. If, however, the dies be operated at the customary speed, it will be found that their action on the billet tends to carry the narrow web of metal on the outside of each crease toward the bottom of each crease—*i. e.*, to reduce the height of the web, so that the resulting horseshoe-billets will be badly distorted. It will also be found that the much thicker web on the other side of the crease will be distorted, especially the corner adjacent to the die.

I have discovered that if the speed of movement of the dies be materially increased it is possible to effect the creasing of the billet without any objectionable displacement of the metal, except the formation of a small bur or fin on the back of the billet along the line of the creased edge and opposite each crease. These burs or fins may be removed from the billet by cutting. I find that the improved result is secured with an apparatus employing rolls when the surface speed of the rolls is made about twice as great as is now ordinarily employed. In other words, as practiced prior to my invention creasing-rolls having a diameter of eight inches have customarily been operated at a shaft speed of about two hundred and fifty turns per minute, giving a surface speed of about five hundred and twenty-five feet per minute. By increasing the shaft speed of eight-inch creasing-rolls to about five hundred turns per minute, giving a surface speed of about one thousand and fifty feet per minute, any objectionable displacement of the material is overcome, since the creasing-dies apparently cut into the metal, and as a result the desired cross-sectional shape of the billet is retained throughout its length. If creasing-rolls of greater or lesser diameter be used, the shaft speed should be properly adjusted, so as to give the desired surface speed to the rolls of somewhat more than a thousand feet per minute. I find that if this surface speed be materially decreased the advantages of my invention are not realized. The surface speed, however, may be increased to any desired or convenient extent, with the consequent utilization of the desirable features of my invention.

In the creasing of a strand-billet by my improved process the billet is formed on its back with square corners, which may be left as such in the finished horseshoe. If it is desired that these corners should be rounded, as is preferable in some instances, the creased billet may be passed through finishing-rolls for that purpose.

In order that the process may be more fully understood, attention is directed to the accompanying drawings, forming part of this specification, which show one form of apparatus for carrying out my process, and in which—

Figure 2:
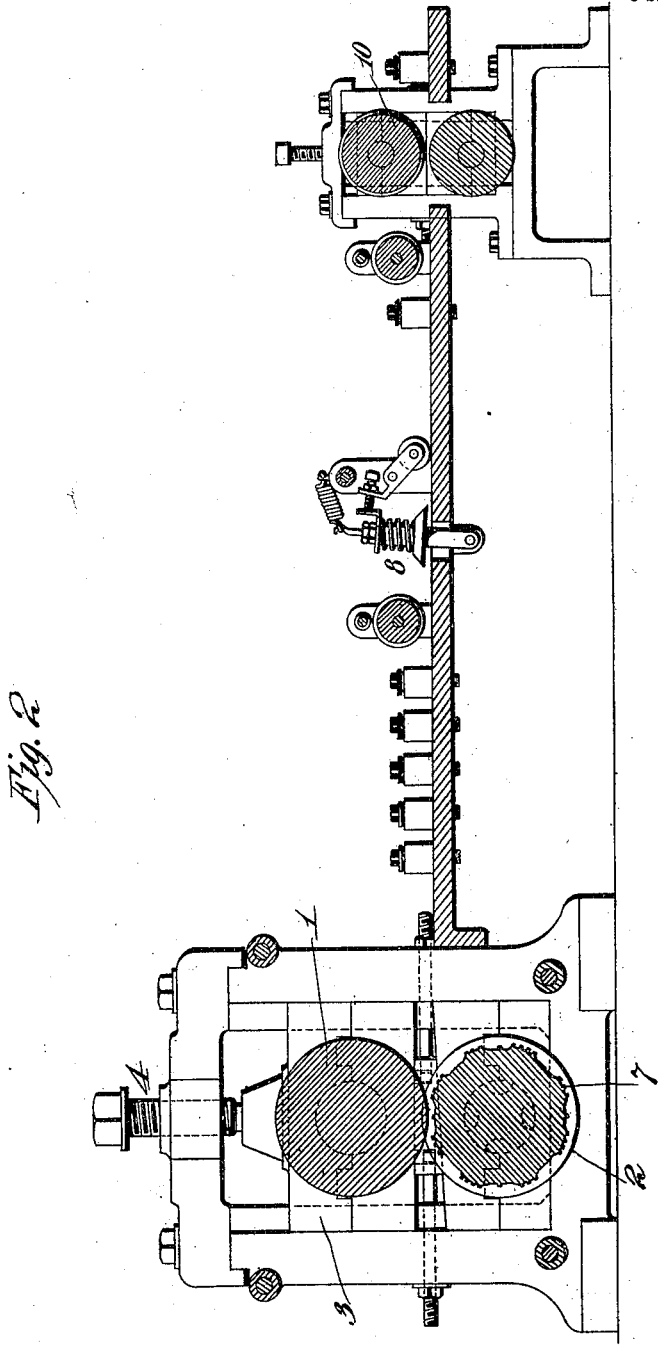
Figure 3:
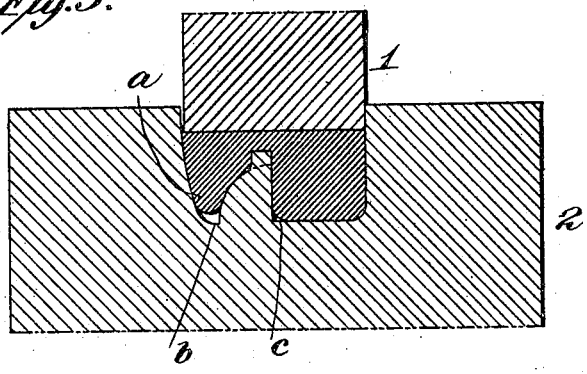
Figure 4:
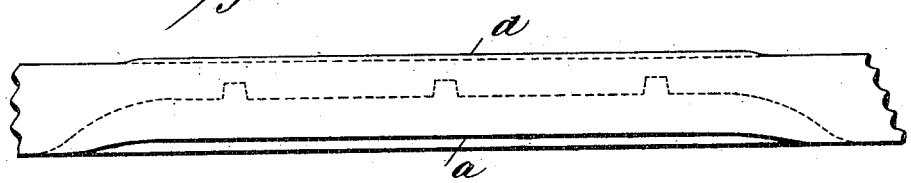
Figure 5:
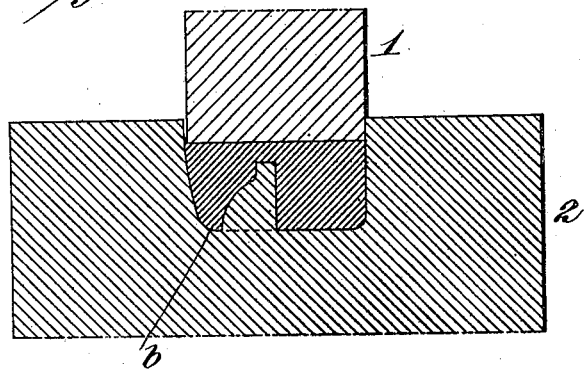
Figure 6:
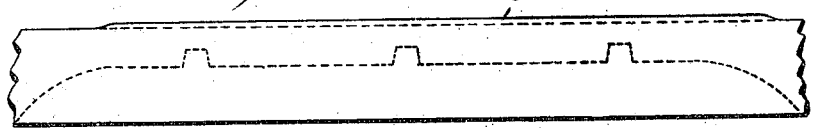
Figure 7:

Figure 1 is a side view of a complete apparatus, showing the means for driving the creasing-rolls at an abnormally high speed. Fig. 2 is a sectional view thereof. Fig. 3 is an enlarged sectional view of a pair of creasing and tongue rolls and a billet therein, showing the effect of rotating the rolls at the customary rate of speed. Fig. 4 is a side view of a portion of a horseshoe-billet, showing the effect of rotating the rolls at the customary rate of speed. Fig. 5 is a sectional view of a pair of creasing and tongue rolls and a billet therein, showing the effect of rotating the rolls at the high surface speed, exceeding one thousand feet per minute. Fig. 6 is a side view of a portion of a horseshoe-billet, showing the effect of rotating the rolls at such high speed; and Fig. 7 is a sectional view thereof.

In all of the several views like parts are designated by the same numerals and letters of reference.

The apparatus illustrated consists of a tongue-roll 1, engaging with a groove-roll 2, the latter being mounted in fixed bearings and the former in vertically-movable housings 3, so that the relation of the two rolls may be adjusted by means of the screw 4 or other equivalent device.

In the apparatus illustrated the groove-roll alone is rotated at an abnormally high rate of speed by means of an engine 5 and a multiplying train of gears 6, the tongue-roll being rotated by frictional contact with the groove-roll or the billet; but it is to be understood that the process may be carried out by an apparatus in which both rolls are positively rotated and in which other means of securing a high shaft speed is used. The creasing-dies 7 are carried within the groove to the lower roll, which is the reverse of the usual practice, a construction which permits the pass to be of the same shape as the cross-section of the horseshoe-billet. The effect of passing a billet through the rolls when the latter are run at the customary surface speed of about five hundred and twenty-five feet per minute, which may be accomplished in the apparatus illustrated by throttling the engine or otherwise reducing its speed, is illustrated in Fig. 3. The web on the creased side of the billet is badly distorted at $a$ and does not extend to the base of the groove at $b$. The same is true as to the other side of the billet; but here the web is much thicker and the distortion is much less, the corner $c$ being but slightly distorted as compared to the web $a$. The billet distorted in this manner cannot be restored to its original cross-sectional shape by any known form of planishing-rolls, for the reason that the web $a$ is not merely distorted, but partially destroyed.

The effect on the billet of running the rolls at an abnormally high surface speed—i. e., exceeding one thousand and fifty feet per minute—is illustrated in Figs. 5 to 7, inclusive. Here the web $a$ is sharply and clearly defined and is the full depth of the groove. Also the angle $c$ of the other web is sharp and definite.

I do not know the theory under which my process operates, but believe that the creasing-dies at the abnormally high speed cut into the metal before the latter can be gradually displaced in the parts adjacent to the crease. In forming the crease there is sometimes a slight bur or fin $d$ on the back of the billet opposite to the crease. This bur or fin may be removed by cutting, as by the rotary cutter 8. The square corners of the billet may be rounded or beveled, when such is desired, by finishing-rolls 9, operated in any suitable manner, as by a belt 10. By rotating the rolls or otherwise moving the dies at the abnormally high speed described danger of breakage of the creasing-dies is removed. One objection to operating the dies at the customary rate of speed is the tendency of the dies to become crushed and broken. At the abnormally high speed described I find that the dies will not become broken in use, but are subjected to but ordinary wear.

The essential features of the invention consist, first, in passing the billets through a pass of a cross-sectional shape similar to their own, and, second, in operating the dies at such an abnormally high surface speed that lateral displacement of the metal is overcome, so as to thereby do away with the necessity of planishing-rolls, as is now practiced.

The apparatus described herein is not claimed in this application for patent, but forms the subject-matter of my case, Serial No. 152,105, filed April 11, 1903.

Having now described my invention, what

I claim as new, and desire to secure by Letters Patent, is—

1. In the art of creasing blanks or bars preparatory to the manufacture of machine-made horseshoes therefrom, the improvement which consists in passing the blank or bar between creasing-rolls operated at a sufficiently high surface speed to overcome distortion of the metal, substantially as set forth.

2. In the art of creasing blanks or bars preparatory to the manufacture of machine-made horseshoes therefrom, the improvement which consists in passing the blank or bar between creasing-rolls operated at a minimum surface speed of approximately one thousand feet per minute, whereby distortion of the metal is overcome, substantially as set forth.

3. In the art of creasing blanks or bars preparatory to the manufacture of machine-made horseshoes therefrom, the improvement which consists in passing the bars between creasing-rolls, having a pass of the same shape as the cross-section of the bars, the said rolls being rotated at a sufficiently high speed to overcome distortion of the metal, substantially as set forth.

4. In the art of creasing blanks or bars preparatory to the manufacture of machine-made horseshoes therefrom, the improvement which consists in passing the bars between creasing-rolls, having a pass of the same shape as the cross-section of the bars, the said rolls being rotated at a minimum surface speed of approximately one thousand feet per minute, whereby distortion of the metal is overcome, substantially as set forth.

This specification signed and witnessed this 29th day of October, 1903.

ARTHUR SMITH.

Witnesses:
W. E. WARD,
O. VAN BILLIARD.